United States Patent
Wade

[19]

[11] Patent Number: 5,957,500
[45] Date of Patent: Sep. 28, 1999

[54] METHOD OF TRANSPORTING A STORAGE TANK

[76] Inventor: Sidney Allen Wade, Rte. 1, Box 303 Tuckers Crossing Rd., Ellisville, Miss. 39437

[21] Appl. No.: 08/819,041

[22] Filed: Mar. 17, 1997

Related U.S. Application Data

[62] Division of application No. 08/450,111, May 25, 1995, Pat. No. 5,653,469.

[51] Int. Cl.⁶ ........................................... B60B 3/22
[52] U.S. Cl. ................. 280/837; 220/562; 220/DIG. 24; 414/474; 414/482
[58] Field of Search ................... 280/837, 839, 280/7, 831, 836, 414.5, 421, 427, 428, 475; 220/562, DIG. 24; 414/474, 482

[56] References Cited

U.S. PATENT DOCUMENTS

| Re. 32,736 | 8/1988 | Lovell ................................. 280/414.5 |
| D. 253,051 | 10/1979 | Fletcher . |
| D. 301,326 | 5/1989 | Adams . |
| D. 318,033 | 7/1991 | Pelt . |
| D. 353,352 | 12/1994 | Holloway, Jr. . |
| 2,067,994 | 1/1937 | Thwaits . |
| 2,237,310 | 4/1941 | Norbom . |
| 2,636,746 | 4/1953 | Meldrum ................................. 280/421 |
| 2,698,758 | 1/1955 | Ronning ................................. 280/421 |
| 3,819,076 | 6/1974 | Oehler ................................... 280/421 |
| 3,831,210 | 8/1974 | Ow . |
| 3,874,696 | 4/1975 | Gardner et al. ........................ 280/427 |
| 4,258,953 | 3/1981 | Johnson . |
| 4,262,920 | 4/1981 | Mettetal . |
| 4,406,471 | 9/1983 | Holloway . |
| 4,589,565 | 5/1986 | Spivey . |
| 4,819,955 | 4/1989 | Cobb . |
| 4,838,443 | 6/1989 | Cripe et al. . |
| 5,004,269 | 4/1991 | Pelt . |
| 5,058,924 | 10/1991 | Whatley . |
| 5,096,336 | 3/1992 | Merrett et al. . |
| 5,141,013 | 8/1992 | Zink et al. . |
| 5,192,101 | 3/1993 | Richardson . |
| 5,213,367 | 5/1993 | Normal et al. . |
| 5,409,251 | 4/1995 | Thorndyke ............................. 280/475 |
| 5,433,578 | 7/1995 | Honan . |
| 5,480,191 | 1/1996 | Litin et al. . |

FOREIGN PATENT DOCUMENTS

| 994916 | 12/1963 | United Kingdom . |
| 8900138 | 1/1989 | WIPO ................................. 280/414.5 |

*Primary Examiner*—Daniel G. DePumpo
*Attorney, Agent, or Firm*—Birch, Stewart, Kolasch & Birch, LLP

[57] ABSTRACT

A method of transporting an empty self-supporting storage tank having a rear wheel chassis, a jack assembly and king pin at the forward end of the storage tank, and an intermediate bottom portion supporting the tank on the ground is disclosed. The forward end of the storage tank is elevated to lift the forward end of the intermediate bottom portion thereof off the ground. The king pin of the storage tank is connected to the fifth wheel of a tractor. The rear wheel chassis is lowered to lift the rear end of the intermediate bottom portion of the storage tank to a transporting height above the ground.

11 Claims, 11 Drawing Sheets

METHOD OF TRANSPORTING A STORAGE TANK

This application is a divisional of application Ser. No. 08/450,111, filed on May 25, 1995, now U.S. Pat. No. 5,653,469 the entire contents of which are hereby incorporated by reference.

BACKGROUND OF THE INVENTION

Large tanks are currently provided for storing and dispensing fluids, such as fracturing liquids, drilling muds, and the like, for use at an oil or gas well site. Such tanks are also used to receive and hold fluids and chemicals at industrial plants. They are also used on environmental clean-up jobs, as well as spills, to hold fluids until they can be properly disposed of. When empty, these tanks are towed by truck from one site to another where they are refilled and reused The tanks usually have lengths of 30 to 40 feet, a height of from approximately 9 to 12 feet, and a width of 8 feet. Various federal, state and local highway ordinances limit the size of these trailers for over-the-road transport. These tanks are constructed to have a large capacity, holding thousands of gallons of liquid; therefore, there is a need to provide a mobile storage tank constructed and arranged to not only increase the storage capacity of the tank for holding fluids at the job site, but also dimensioned to conform to the highway ordinances for over-the-road transport.

SUMMARY OF THE INVENTION

The mobile storage tank of the present invention is provided with a ladder and manholes which are recessed into the walls of the tank so that a maximum height of twelve feet, six inches, and a width of eight feet, six inches can be obtained, and still be in conformance with highway law regulating the size of trailers.

The storage tank is provided with a sloped bottom wall and a side manhole positioned so that a person, while standing on the ground, can have access to the interior of the tank for the cleaning thereof.

The storage tank is also provided with a jack system and a king pin for a fifth wheel on the front thereof, and a rear wheel lift system, to not only facilitate the towing of the empty tanks by a regular tractor, but also to facilitate the draining of the tank, and provide a new method of transporting and draining fluid from the tanks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
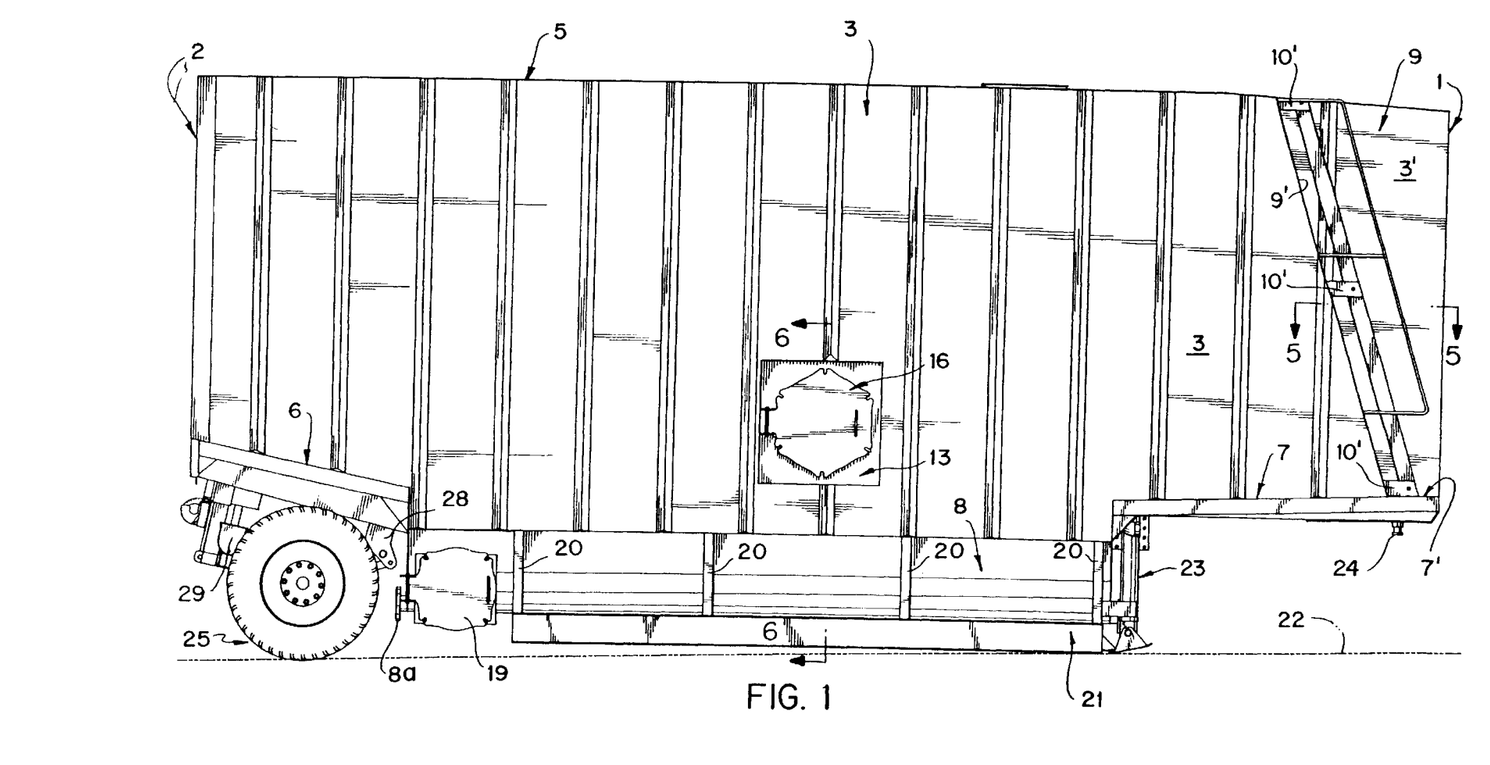
FIG. 1 is a side elevational view of the mobile storage tank of the present invention, with the rear wheels in the lowered position and the front portion of the storage tank resting on the ground.
Figure 2:
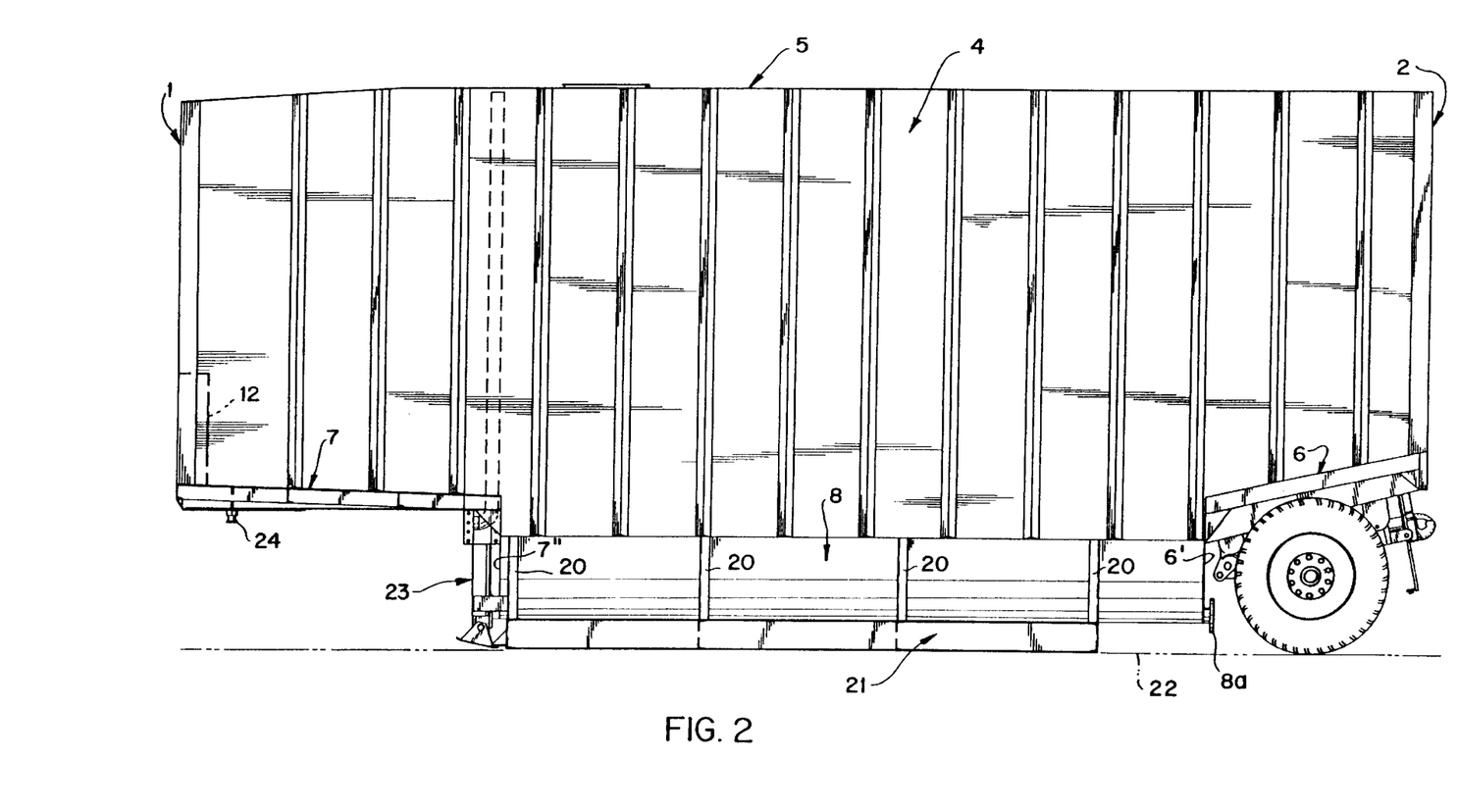
FIG. 2 is an elevational view of the side of the tank opposite to that shown in FIG. 1, and showing the rear wheels in the elevated position and the storage tank resting on the ground.
Figure 3:
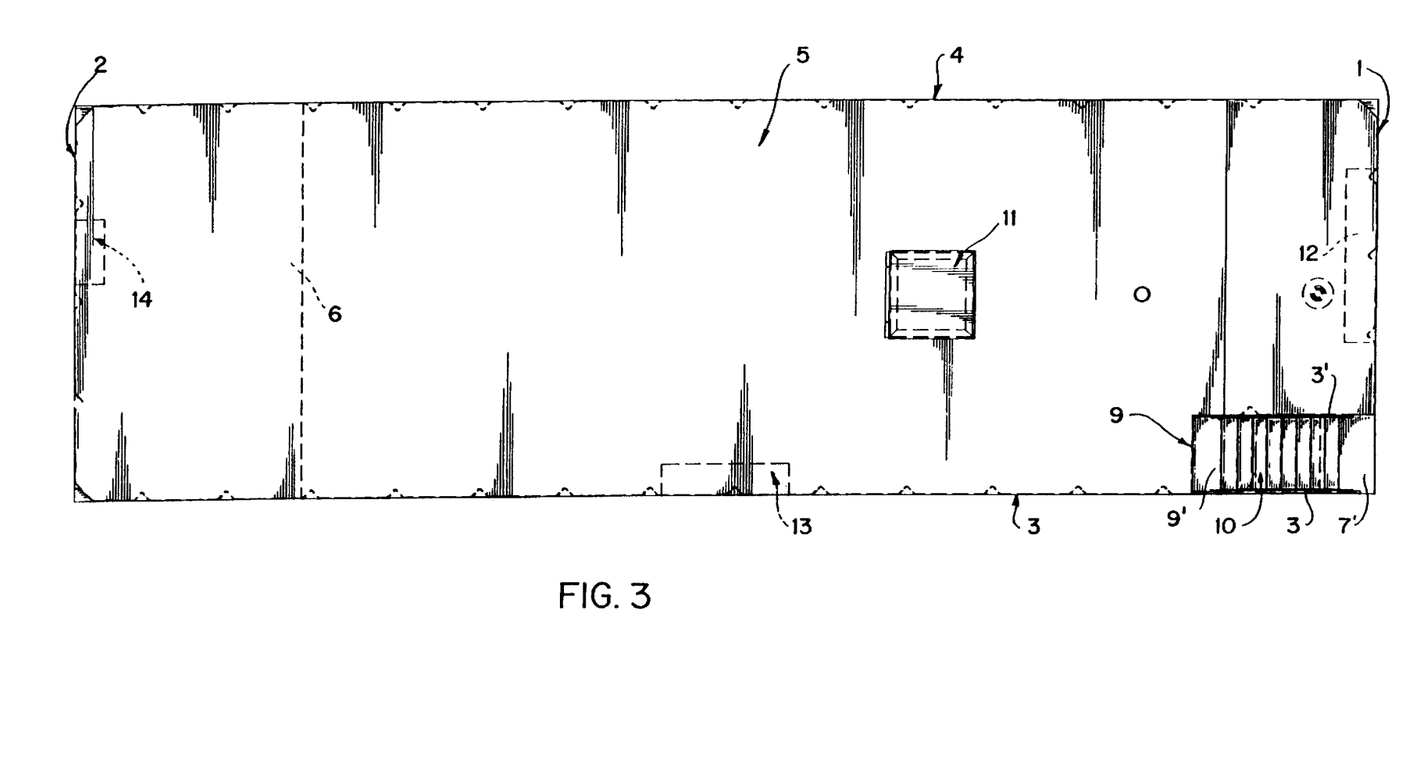
FIG. 3 is a top plan view of the storage tank.

Referring to the drawings in greater detail, and more particularly to FIGS. 1, 2 and 3, the mobile storage tank of the present invention comprises, an elongated enclosure having a front or forward end 1, a rear end 2, a pair of opposed, vertically extending side walls 3 and 4, a top wall 5, bottom wall 6 at the rear end, and a bottom wall 7 at the forward end. The bottom walls 6 and 7 are sloped downwardly toward a downwardly curved bottom wall 9 intermediate the bottom walls 6 and 7, with a rearwardly extending drain fitting 8a communicating with the inner bottom of the bottom wall 8.

Figure 4:
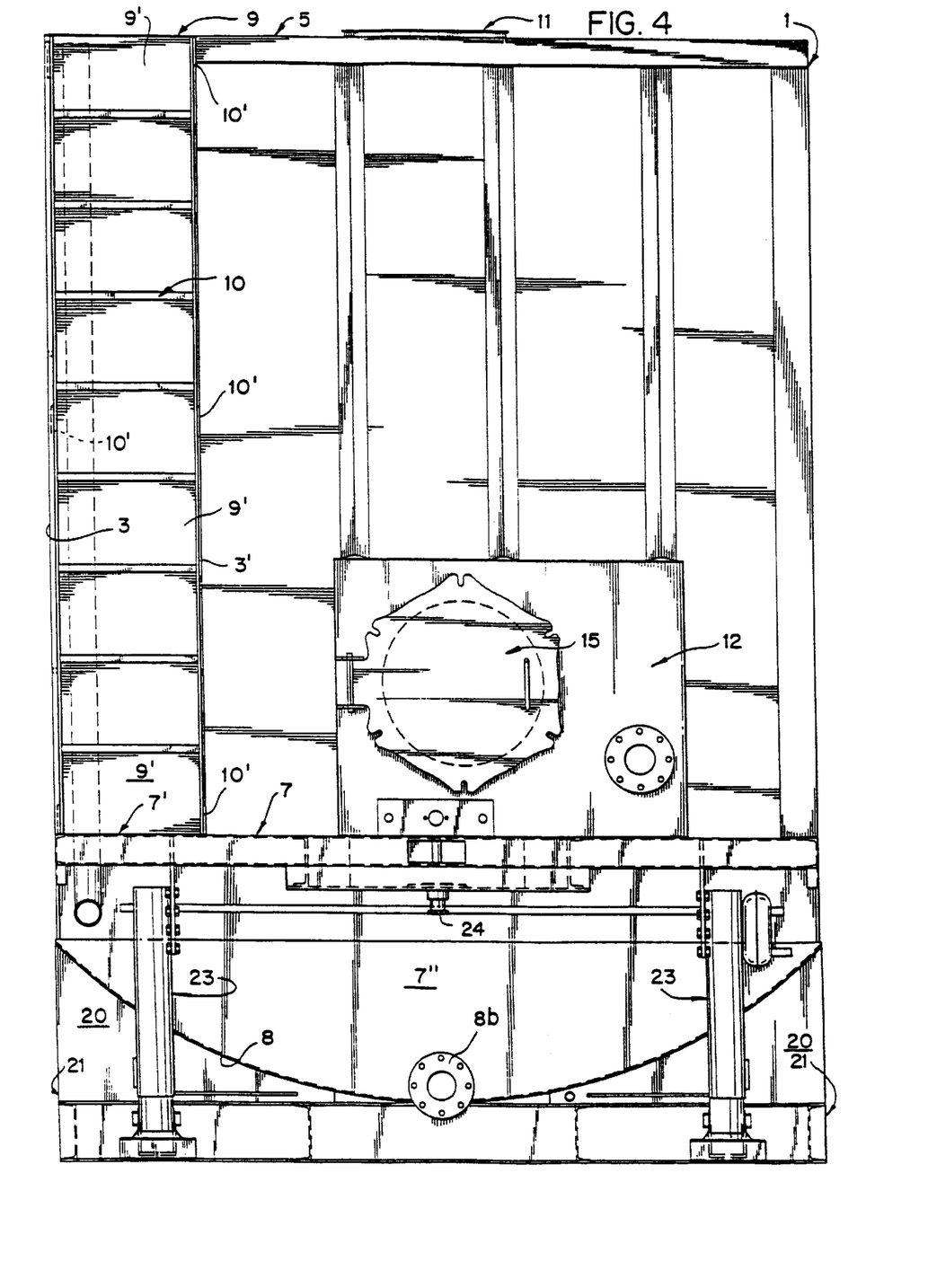
FIG. 4 is an enlarged front elevational view of the storage tank.
Figure 5:
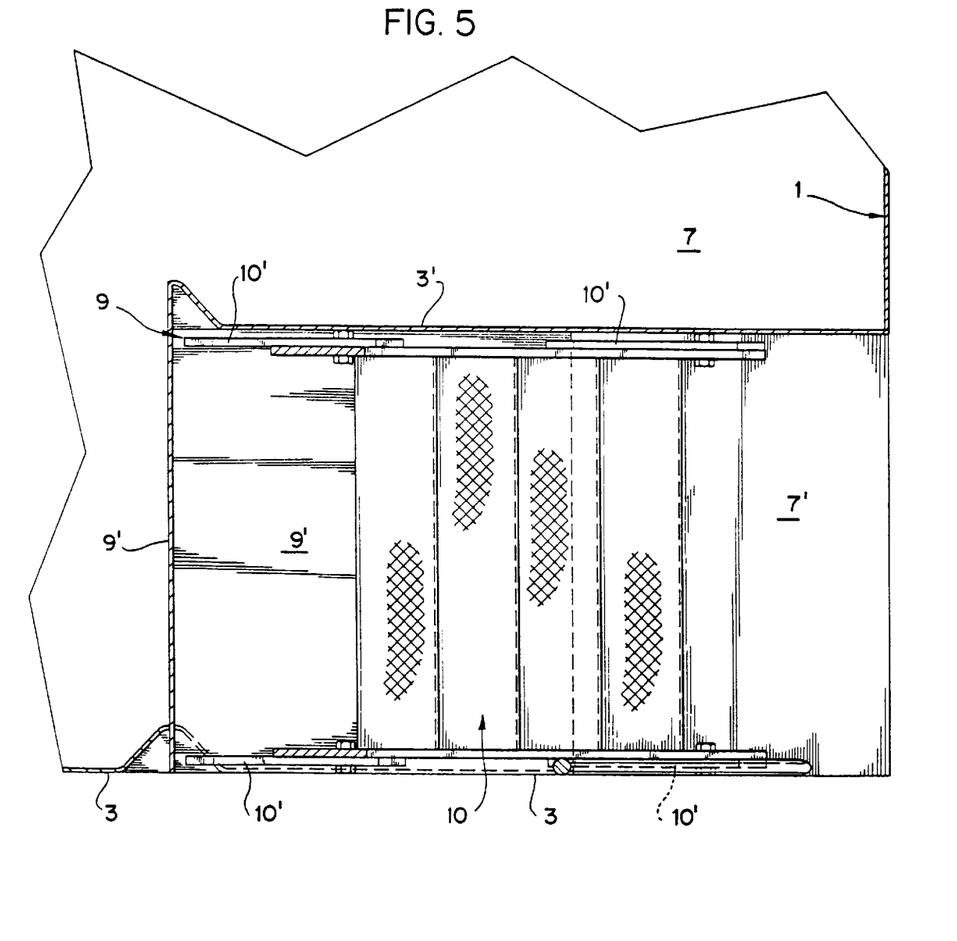
FIG. 5 is a fragmentary, horizontal sectional view taken substantially along line 5—5 of FIG. 1.

As will be seen in FIGS. 3, 4 and 5, a recess 9 is provided in a corner of the tank at the forward end 1 inside wall 3 for accommodating a ladder 10 to facilitate access to the tank top wall 5 and manhole 11 mounted therein. It is to be understood that recess 9 can be provided in any corner of the tank but the forward right corner in which it is shown is the preferred position. The recess is formed by bottom wall 9' extending diagonally between, and connected at its ends to, top wall 5 and external portion 7' of forward bottom wall 7. The side edges of diagonally extending bottom wall 9' are connected by welding to corresponding diagonal edges of side wall 3 and recessed side wall portion 3'. The ladder 10 is connected to the diagonal or downwardly and forwardly sloping bottom wall 9' by stand-off elements 10'.

Similarly, recesses 12, 13 and 14 are provided in the forward end 1, side wall 3 and rear end 2' for housing manholes 15, 16 and fitting 17 (FIGS. 6 and 7) respectively.

By recessing the ladder 10, manholes 15 and 16, and fitting 17 within their respective walls a maximum volumetric dimension can be obtained for the storage tank while still conforming to highway laws regulating the size of trailers.

Furthermore, the manholes 15 and 16 are positioned at a predetermined height so that a person, while standing on the ground, when the tank is on the ground, can have access with his head, shoulder and arms to the interior of the tank for the cleaning thereof. The draining and cleaning of the tank is further facilitated by the sloped bottom walls 6 and 7 communicating with the longitudinally extending curved bottom wall 8 which, in turn, communicates at the rear end thereof with a laterally and downwardly extending conduit 18 having a hinged cover 19. The arcuately curved bottom wall 8 also communicates at the rear end thereof with the rearwardly extending centrally located drain fitting 8a, and at the front end thereof with the forwardly extending centrally located drain fitting 8b is These three drains provide the operator versatility in cleaning and draining the tank according to its position relative to where the fluid being drained must be directed. The rearwardly extending drain fitting 8a is connected on vertical rear end wall 6' that connects rear sloped bottom wall 6 to curved bottom wall 8, while forwardly extending drain fitting 8b is connected on vertical front end wall 7' that connects forward end sloped bottom wall 7 to curved bottom wall 8.

Figure 6:
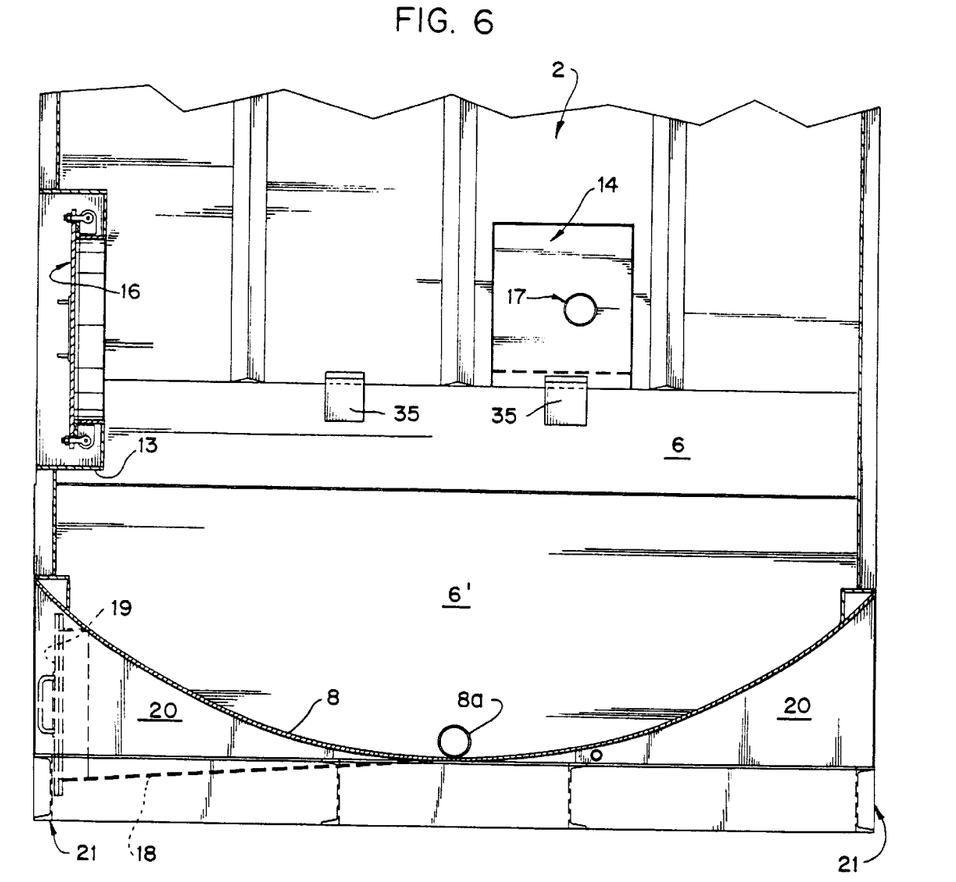
FIG. 6 is a fragmentary, cross-sectional view taken substantially along line 6—6 of FIG. 1.
Figure 7:
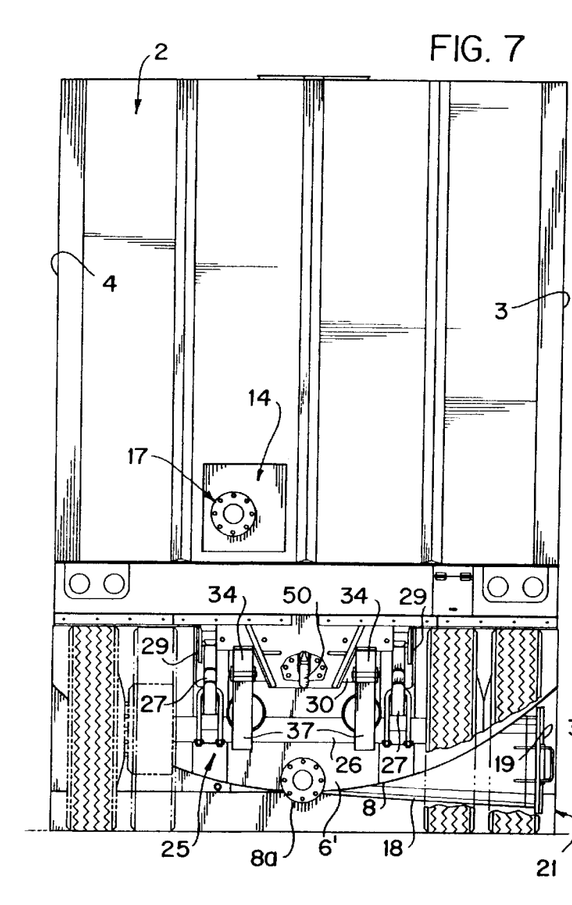
FIG. 7 is a rear elevational view of the mobile storage tank wheel chassis in the elevated position.
Figure 13:
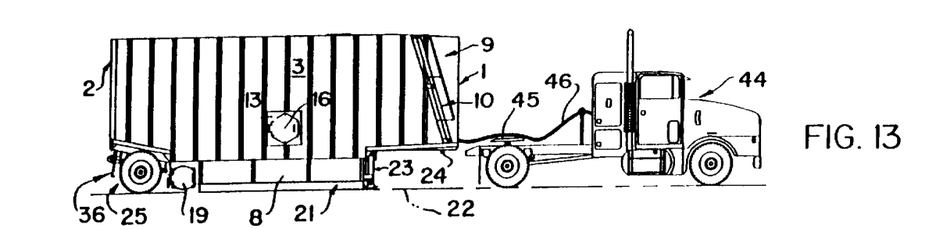
FIGS. 13, 14, 15 and 16 are side elevational views illustrating the sequential steps of attaching the mobile storage tank to a tractor for transport.

As will be seen in FIGS. 4 and 6, the curved bottom 8 having the rearwardly extending drain fitting Ba and forwardly extending drain fitting 8b, is supported by cradle members 20 connected between the curved bottom 8 and a flat, reinforced floor 21 constructed of longitudinally and laterally extending channel members, providing a skid for supporting the tank on the ground 22, as shown in FIGS. 2 and 13. The tank can also be supported on the ground by a pair of laterally spaced, telescopic jacks 23 which can be either manually actuated or fluid actuated, the jacks 23 being connected to the tank adjacent opposite sides and adjacent the rearwardly extending end of sloped bottom wall 7, and in front of vertical front end wall 7" as shown in FIGS. 1, 2 and 4. The telescopic jacks 23 have a retracted length such that in the retracted position, as shown in FIGS. 1, 2 and 4, the top ends are adjacent the bottom of front bottom wall 7, and the bottom ends are adjacent the bottom of reinforced floor 21 and the ground, thus extending the height of reinforced floor 21 and front end wall 7". A king pin 24 is connected to the bottom wall 7 for connection to the fifth wheel of a tractor to be described more fully hereinafter, Referring to FIGS. 7 to 10, the rear of the storage tank is supported by a rear wheel chassis 25 including an axle 26 connected to the medial portion of a leaf spring 27 having its outer ends connected to spring hangers or brackets 28 and 29. While bracket 28 is fixedly connected to the bottom wall 6 of the storage tank, the bracket 29 is mounted to the outer end of a cross beam 30, as shown in FIG. 11.

Figure 8:
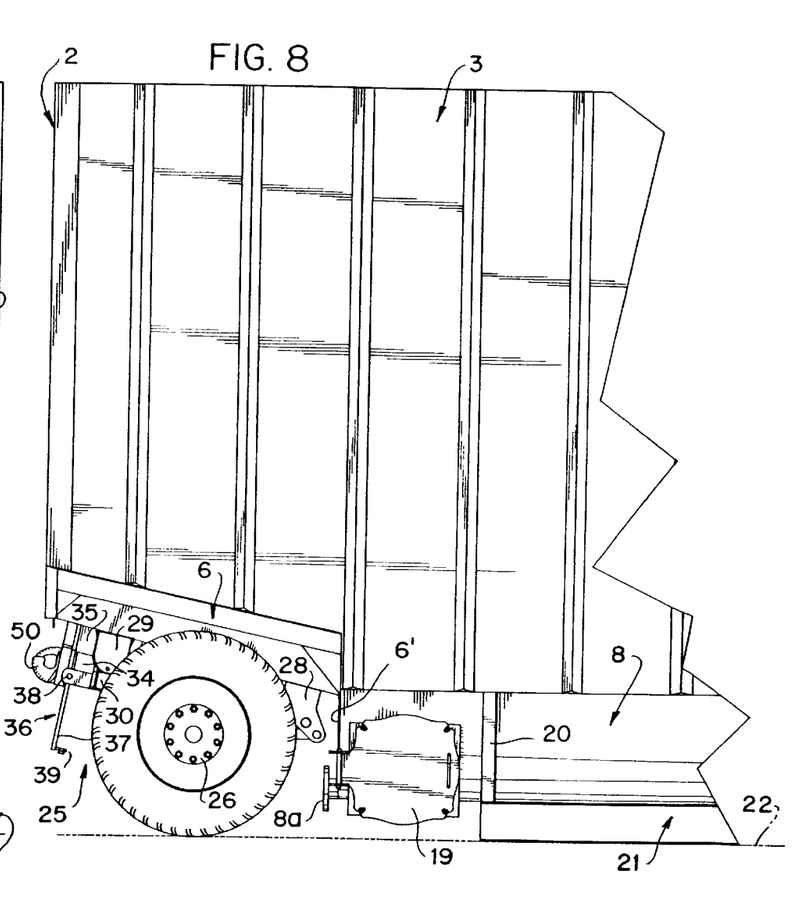
FIG. 8 is a fragmentary, side elevational view of the rear of the storage tank, showing the tank resting on the ground when the rear wheels are in the elevated position.
Figure 9:
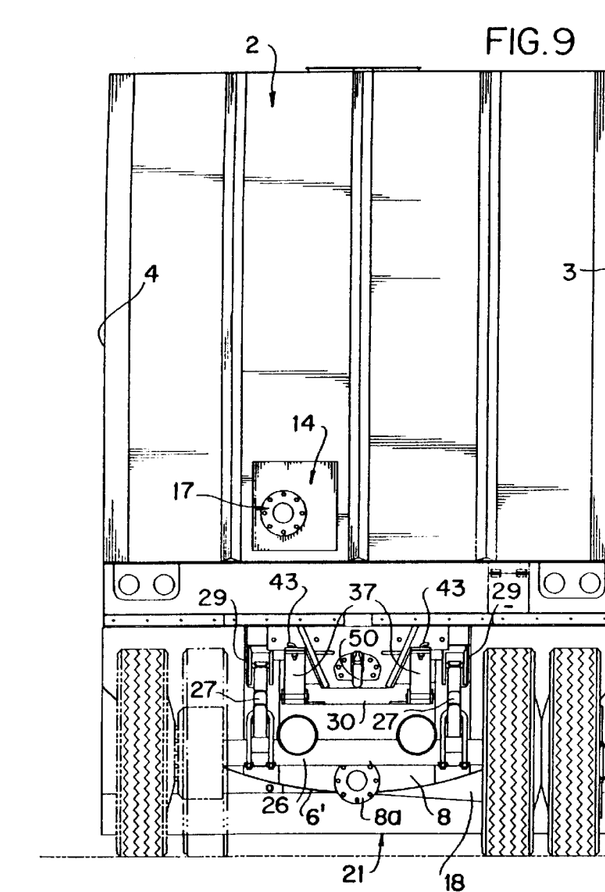
FIG. 9 is a rear elevational view of the mobile storage tank wheel chassis in the lowered position.
Figure 10:
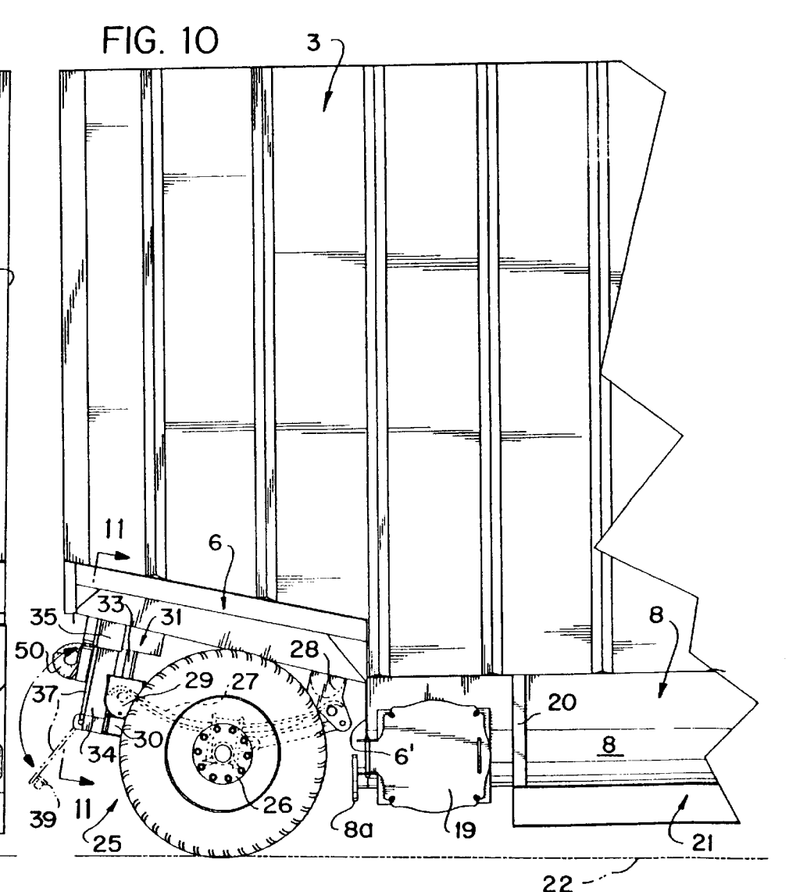
FIG. 10 is a fragmentary, side elevational view of the storage tank showing the rear of the tank in the elevated position above the ground when the rear wheels are in the lowered position.
Figure 11:
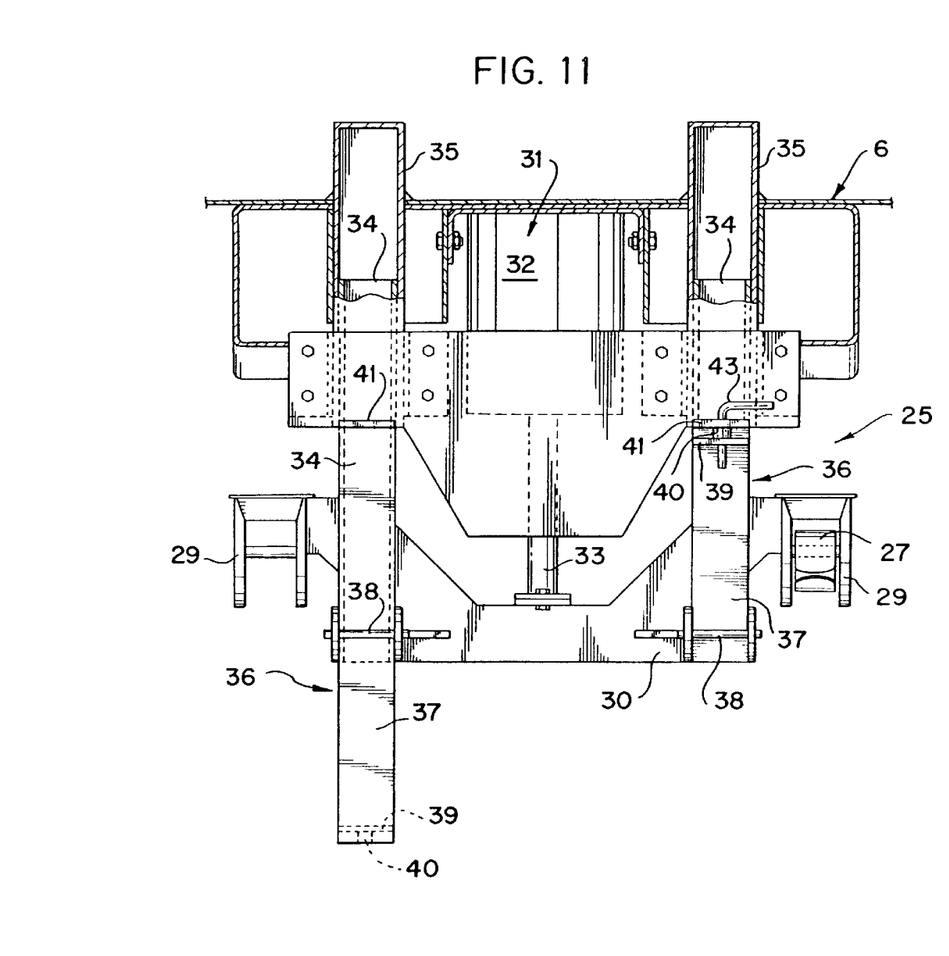
FIG. 11 is a view taken substantially along line 11—11 of FIG. 10 illustrating the extension and retraction mechanism for lowering and raising the rear wheel chassis.

A fluid motor 31, including a cylinder 32 connected to the bottom wall 6 and a piston rod 33 connected to the cross beam 30, is provided either for raising the cross beam 30 and associated wheel chassis 25, to thereby lower the storage tank to rest on the ground, as shown in FIG. 8, or for lowering the wheel chassis 25 to lift the storage tank off the ground, as shown in FIGS. 10 and 11.

Figure 12:
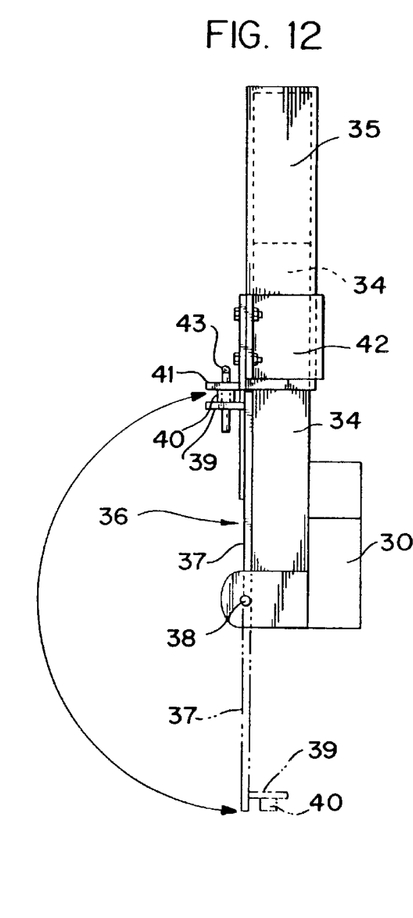
FIG. 12 is a side elevational view of one of the latching devices employed in the extension and retraction mechanism shown in FIG. 11.

The reciprocatory movement of the cross beam 30 is guided by a pair of spaced, parallel, vertically extending tubes 34 having their lower end portions integral with the cross beam 30, and their upper end portions telescopically received in tubular members 35 integral with the bottom wall 6 of the storage tank, and protruding through the bottom wall to the inside of the storage tank, as shown in FIGS. 6 and 11. In order to hold the guide tubes 34 in the extended position, while the wheel chassis 25 is in the lowered position, a latch assembly 36 is provided for each telescopic tube 34. Each latch assembly 36 comprises a plate 37 pivotally connected as at 38, by a pivot rod welded on one end, to the lower end of movable tube 34 The free end of plate 37 is provided with an apertured flange 39 having a boss 40. A similar apertured flange 41 is fixedly attached to the lower end of tubular member 35 by a bracket 42. To hold the tube 34 in the extended position, the plate 37 is pivoted upwardly, as shown in FIG. 12, so that the boss 40 abuts and aligns with the apertured flange 41, and a latch pin 43 is inserted through the flange 41, boss 40, and flange 39.

Figure 14:
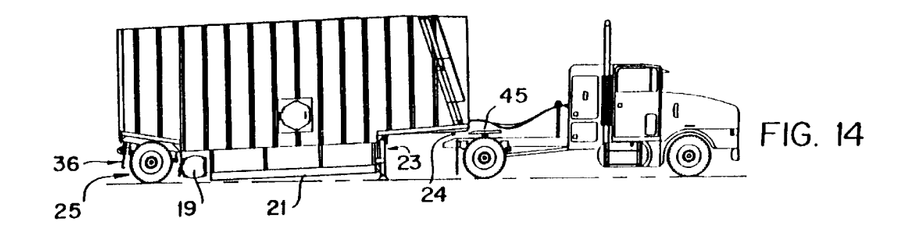
Figure 15:
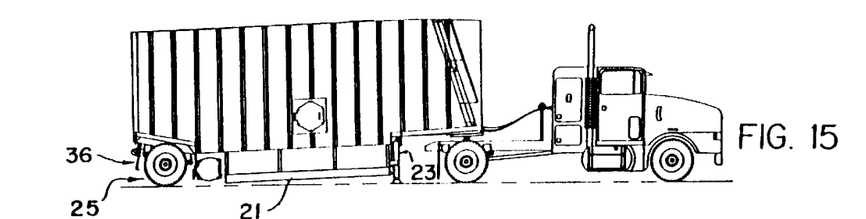
Figure 16:
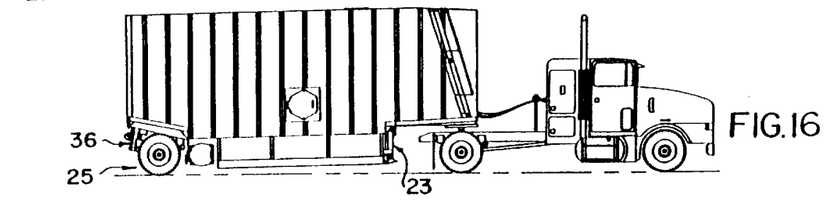

FIGS. 13 to 16 illustrate the method by which an empty storage tank is transported from one site to another. As will be seen in FIG. 13, the storage tank is resting on the ground and a tractor 44 is backed into position so that the fifth wheel 45 on the tractor 44 is aligned with the king pin 24 on the storage tank. Suitable pneumatic and/or hydraulic hoses 46 are then connected between the storage tank and the tractor 44 to use the pressurized system on the tractor to pressurize the pneumatic and/or hydraulic system, not shown, on the storage tank. The jacks 23 are then extended, as shown in FIG. 14, to lift the front of the storage tank a sufficient distance to allow the tractor 44 to back into the front of the storage tank to lock the fifth wheel 45 to the king pin 24, as shown in FIG. 15, while the brakes on the rear wheel chassis are applied The fluid motor 31 is then actuated to lower the rear wheel chassis 25, to thereby lift the rear of the storage tank off the ground, as shown in FIG. 16, and the jacks 23 are retracted and the latch assemblies 36 are manipulated, and the latch pins 43 inserted, to hold the wheel chassis 25 in the lowered position.

After the tank is transported to its new site it is deposited on the ground at the new site using the reverse method described, except that after the rear wheel chassis is raised to lower the rear end of the storage toward the ground, the jacks 23 are then extended to the ground to support the forward end of the storage tank above the ground. The king pin 24 is then disconnected from the fifth wheel 45 of the tractor 44 by moving the tractor out from under the king pin 24. The jacks 23 are then retracted lowering the reinforced floor 21 of the storage tank onto the ground. It is to be understood that in this method of lowering the tank onto the ground, the jacks 23 can first be extended into contact with the ground and thereafter the rear wheel chassis can be raised to lower the rear end of the tank, or these steps can be conducted simultaneously, followed by the steps of disconnecting the king pin from the tractor, and then lowering the tank onto the ground by retracting the extended jacks 23.

Figure 17:
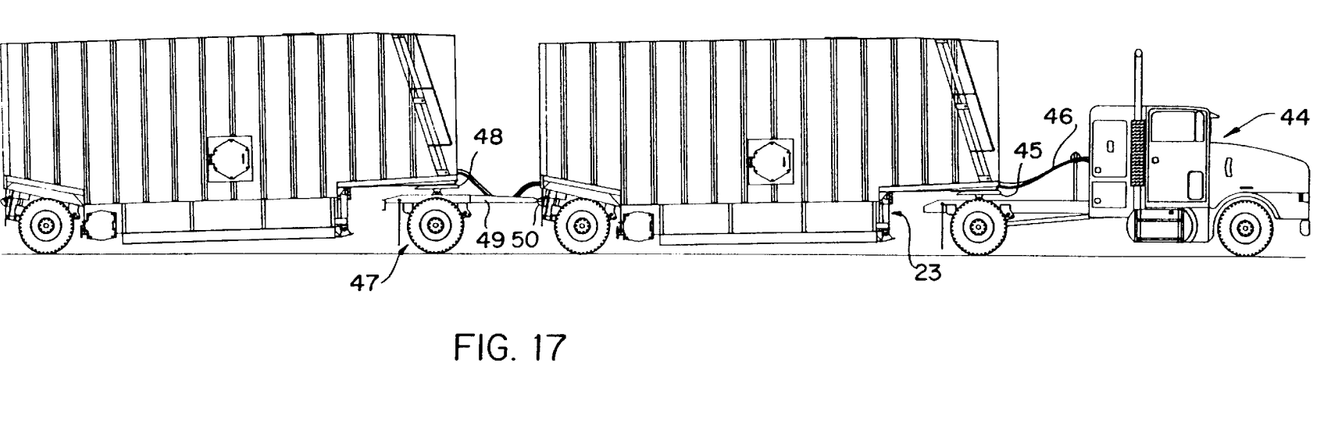
FIG. 17 is a side elevational view of a pair of tandem mobile storage tanks connected to a tractor.

While one storage tank can be transported, as shown in FIGS. 13 to 16, a pair, or more, of storage tanks can be transported in tandem, as shown in FIG. 17, wherein the second storage tank is connected to the rear end of the first storage tank by a conventional trailing dolly 47 having a fifth wheel 48 connected to the king pin on the second trailer and a tongue 49 connected to a hitch 50 on the rear of the first trailer.

While the manipulation of the jacks 23 and wheel chassis 25 has been described with regard to the connection of the storage tank to a tractor, it will be appreciated by those skilled in the art that the movement of the jacks 23 and wheel chassis 25 can also be employed for tilting the storage tank so that the tank can be fully drained through the fittings 8a and 8b and the laterally extending conduit 18 during the cleaning of the tank, which cleaning is further facilitated by the manholes 15 and 16 being positioned at a predetermined height above the ground to allow a person standing on the ground to have access to the interior of the tank with his head, shoulders, arms, and a hose for hosing down the interior.

The storage tank has a pair of pressurized pneumatic tanks, not shown for sake of clarity, for pressurizing the pneumatic and/or hydraulic systems on the storage tank. These pressurized pneumatic tanks are preferably located above the rear wheel chassis 25, below rear bottom wall 6, and between fluid motor 31 and rear end wall 6'. This pressurized pneumatic source is connected into the brake system of the rear wheel chassis as a safety feature, and can be used in the new method of cleaning the tank, or the pressurized system of the tractor can be used by connecting the hoses 46 from the tractor to the tank system Which pressurized source will be used in the cleaning method will depend upon the orientation of the tank at the site relative to a holding pond or the like for the waste cleaning water from the tank, and if a tractor can be placed adjacent the tank.

If, for instance, the waste fluid holding pond is in front of the tank, the waste water from cleaning will be drained from the storage tank through forwardly extending drain fitting 8b. With the tank on the ground using side manhole 16, and/or front manhole 15, the cleaner can bend to place his head, shoulders, arms and the nozzle of a cleaning hose inside the tank during a hose-down cleaning operation. Since rear bottom wall 6 and front bottom wall 7 slope downwardly toward the downwardly curved side bottom wall 8, all of the waste cleaning fluid drains down to the bottom wall 8. With a drain hose attached to forwardly extending drain fitting 8b fluid motor 31 is actuated to lower the rear wheel chassis 25, as shown in FIG. 1, to thereby lift the rear of the storage tank off the ground, while the front of the storage tank is still on the ground, causing the waste cleaning water to be expelled through forward drain fitting 8b which is then at the lowermost point of the storage tank.

If, for instance, the waste fluid holding pond is in back of the storage tank, the waste water from cleaning will be drained from the storage tank, in a similar manner, either through rearwardly extending drain fitting 8a or side conduit 18 and cover 19. With the rear wheel chassis 25 raised, and its brakes applied, the pair of jacks 23 are extended to thereby lift the front of the storage tank off the ground to the point as shown in FIG. 14, causing the waste cleaning water to drain to the rear of the tank and be expelled through rearward drain fitting 8a and/or side conduit 18 and manhole cover 19, which are then at the lowermost point of the storage tank.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A method of transporting a self-supporting storage tank comprising the steps of:
   a) providing a storage tank having a bottom wall, said bottom wall including a front end portion, a rear end portion, and an intermediate portion between said front end portion and said rear end portion for supporting said storage tank on the ground;
   b) providing a king pin adjacent said front end portion of said bottom wall;
   c) providing a jack assembly adjacent said front end portion of said bottom wall;
   d) providing a rear wheel chassis including an axle extending substantially across a width of said storage tank which supports at least one pair of transport wheels;
   e) pivotally mounting said rear wheel chassis below said rear end portion of said bottom wall;
   f) providing an elevating device for raising and lowering said rear wheel chassis in an arcuate manner;
   g) elevating a forward end of the storage tank by extending said jack assembly to lift a forward end of the intermediate portion off of the ground;
   h) connecting the king pin of the storage tank to a fifth wheel of a tractor;
   i) retracting the jack assembly; and
   j) lowering the rear wheel chassis in an arcuate manner by actuating the elevating device to lift a rearward end of the intermediate portion of the storage tank to a transporting height above the ground.

2. The method of transporting a self-supporting storage tank as set forth in claim 1, including before the elevating step, connecting the pressurized pneumatic/hydraulic system of a tractor by hoses to a pneumatic/hydraulic system on the storage tank and pressurizing the same, applying the brakes on the rear wheel chassis of the storage tank, and thereafter conducting the elevating and lowering steps through the pressurized pneumatic/hydraulic system of the tractor.

3. The method of transporting a self-supporting storage tank as set forth in claim 1, including upon arrival at a new site:
   k) raising the rear wheel chassis to lower the rear end of the intermediate portion of the storage tank toward the ground;
   l) lowering the jack assembly into contact with the ground to support the forward end of the storage tank about the ground;
   m) disconnecting the king pin of the storage tank from the fifth wheel of the tractor; and
   n) lowering the intermediate portion of the storage tank onto the ground by retracting the jack assembly.

4. The method of transporting a self-supporting storage tank as set forth in claim 3, in which steps k) and l) are reversed.

5. The method of transporting a self-supporting storage tank as set forth in claim 3, in which steps k) and l) are conducted simultaneously.

6. The method of transporting a self-supporting storage tank as set forth in claim 1, further comprising the step of sloping said front end portion and said rear end portion of said bottom wall downwardly toward said intermediate portion.

7. The method of transporting a self-supporting storage tank as set forth in claim 1, further comprising the step of providing said intermediate portion with a curved bottom wall portion.

8. The method of transporting a self-supporting storage tank as set forth in claim 7, further comprising the steps of:
   providing said intermediate portion with a cradle portion having a flat reinforced floor; and
   supporting said storage tank on said ground by said cradle portion.

9. The method of transporting a self-supporting storage tank as set forth in claim 1, further comprising the steps of:
   providing a pair of leaf springs for supporting said axle; and
   pivotally mounting one end of said leaf springs to said storage tank.

10. The method of transporting a self-supporting storage tank as set forth in claim 1, further comprising the step of providing said intermediate portion spaced below and separated from said front end portion and said rear end portion.

11. The method of transporting a self-supporting storage tank as set forth in claim 1, further comprising the step of providing a rear end wall extending upwardly from said rear end portion of said bottom wall.

* * * * *